United States Patent [19]

Suzuki

[11] Patent Number: 4,491,402
[45] Date of Patent: Jan. 1, 1985

[54] METHOD OF FOCUS DETECTION

[75] Inventor: Takeomi Suzuki, Tokyo, Japan

[73] Assignee: Asahi Kogaku Kogyo Kabushiki Kaisha, Tokyo, Japan

[21] Appl. No.: 410,876

[22] Filed: Aug. 24, 1982

[30] Foreign Application Priority Data

Sep. 10, 1981 [JP] Japan ............................. 56-141675

[51] Int. Cl.$^3$ ........................... G03B 7/08; G01J 1/44
[52] U.S. Cl. .................................... 354/406; 250/204
[58] Field of Search .................. 354/25 R, 25 P, 406, 354/407; 250/201, 204

[56] References Cited

U.S. PATENT DOCUMENTS 4,083,056  4/1978  Nakamura et al. .................. 354/25
4,349,254  9/1982  Jyojiki et al. ......................... 354/25

Primary Examiner—William B. Perkey
Attorney, Agent, or Firm—Browdy and Neimark

[57] ABSTRACT

A method of focus detection is disclosed, in which at least two pairs of light receiving element rows are arranged with respect to a photographing lens, and light splitters, each of which wave front splits the light flux from the photographing lens into two light fluxes, are provided for the respective light receiving element rows in the light receiving element row pairs. Light intensity distributions detected by the light receiving element rows at least between two light receiving element row pairs are compared to determine whether an image forming plane is in pre- or post-focus or in focus. Contrast signal values of the object image detected from the light receiving element rows between the light receiving element rows of at least one of the light receiving element row pairs are compared to determine whether the image forming plate is in pre- or post-focus or in focus. The result of at least either comparison is used for focus adjustment.

6 Claims, 5 Drawing Figures

FIG. 1
PRIOR ART
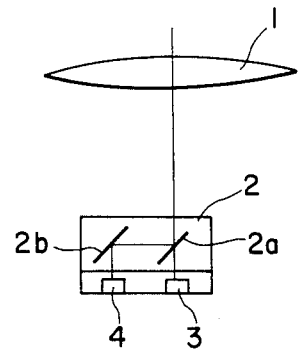
FIG. 2
PRIOR ART
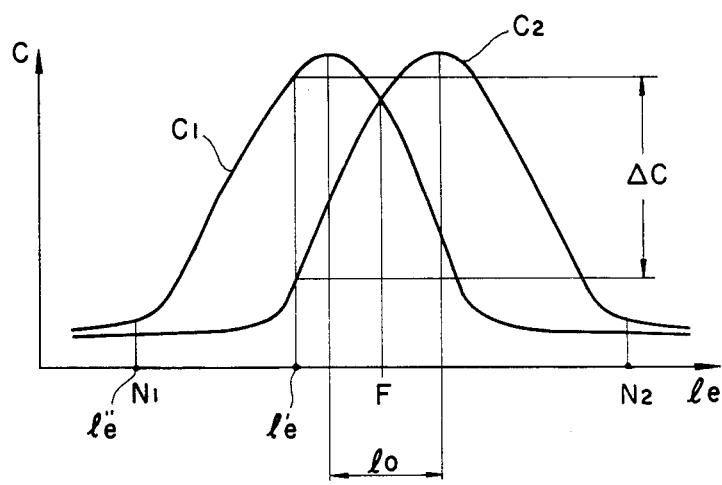
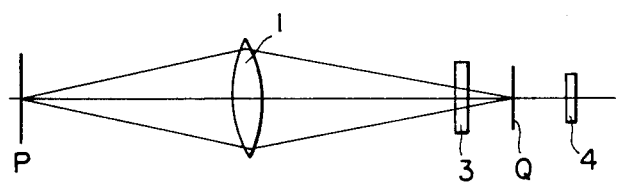

METHOD OF FOCUS DETECTION

BACKGROUND OF THE INVENTION

1. Field of the Invention

This invention relates to a focus detection method for detecting the camera focus (hereinafter referred to as focus) from contrast signal values of the optical image of an object and the light intensity distribution of the image using light receiving elements.

2. Description of the Prior Art

The optical image of an object focused by the photographing lens has a characteristic that the difference in the intensity between bright and dark parts of an image, i.e., the contrast thereof, is maximum when the image is exactly focused. The focus thus can be automatically detected by detecting the maximum contrast.

Among the hitherto proposed methods of focus detection, there is one called a contrast system. FIG. 1 shows this system. As is shown, the system includes light receiving element rows 3 and 4 which are optically spaced apart a fixed distance in a direction parallel to the optical axis of a photographing lens 1. The system includes a light splitter 2 for amplitude splitting the optical image from the photographing lens 1. The light splitter 2 includes a semi-transparent mirror 2a and a reflecting mirror 2b, these mirrors being disposed to re-direct the incident optical image to the respective light receiving elements 3 and 4. Contrast signal value of the detected optical image are calculated using a predetermined evaluation equation to detect which one of the two light receiving elements rows 3 and 4 is closer to the image forming plane of the photographing lens 1.

FIG. 2 shows the contrast signal value which is given as a function of the distance $l_e$ covered by the lens. Curves $C_1$ and $C_2$ show contrast signal values of the optical images detected by the first and second light receiving element rows 3 and 4. Since the optical image from the lens is equally split by the light splitter 2 into two images, the curves $C_1$ and $C_2$ are identical in shape but are spaced apart in the distance axis direction by an amount corresponding to the optical distance $l_o$ between the first and second light receiving element rows 3 and 4.

The point F of intersection of the two curves $C_1$ and $C_2$ corresponds to a point at an equal distance from the two light receiving element rows 3 and 4, i.e., the mid point between the light receiving element rows 3 and 4. This point usually constitutes a focal point, which is contained in a focal plane Q on which the optical image of an object P is focused. When the distance $l_e$ covered by the lens is changed in the neighborhood of the point F, that is, when it is changed to $l_e = l'_e$, a difference $\Delta C$ is provided in the contrast signal value C between the optical images from the first and second light receiving element rows 3 and 4. In this case, the image forming plane is determined to be closer to the first light receiving element row 3 of the higher contrast signal value C. The photographing lens 1 is thus moved for focus adjustment until the contrast signal values C of both the light receiving element rows 3 and 4 are equal.

Similar focus adjustment is also made when the image forming plane Q is determined to be closer to the second light receiving element row 4.

In regions apart from the intersection point F, i.e., on the left hand side of the neighborhood of point $N_1$ and on the right hand side of the neighborhood of point $N_2$ in FIG. 2, the object image is extremely out of focus, and the contrast signal values C of both the rows are very small and substantially equal. For example, when $l_e = l''_e$, the difference between both the contrast signal values C is very small. If an error in the whole detecting apparatus is substantial, therefore, it is difficult in this case to determine which one of the light receiving element rows the image forming plane Q is closer to.

As has been shown, with the prior art focus detection method based on the contrast system, the image forming plane cannot be detected if it is greatly out of focus although it can be well detected and brought to focus if it is in the neighborhood of the focal point.

SUMMARY OF THE INVENTION

The present invention seeks to solve the above problems in the prior art focus detection method. More particualarly, its object is to provide a method of focus detection by arranging at least two pairs of light receiving element rows with respect to a photographing lens, providing light splitters for the respective light receiving element rows in the light receiving element row pairs, said light splitters each wave front splitting the light flux from the photographing lens into two light fluxes, and comparing light intensity distributions detected by the light receiving element rows at least between two light receiving element row pairs to determine whether an image forming plane is in pre- or post-focus or in focus, and focusing the image forming plane by using the result of the comparison.

Another object of the present invention is to provide a method of focus detection, in which whether the image forming plane is in pre- or post-focus or in focus is determined from the comparison of light intensity distributions at least between two light receiving element row pairs and also from the comparison of contrast signal values of the object image detected from the light receiving element rows between the light receiving element rows of at least one of the light receiving element row pairs, at the result of at least one of the two comparisons being used for focusing the image forming plane, thereby further enhancing the accuracy of focusing and providing for increased versatility.

BRIEF DESCRIPTION OF THE DRAWINGS

FIG. 1 is a schematic view showing a set-up for carrying out the prior art focus detection method;

FIG. 2 is a graph showing the relation of contrast signal values obtained from individual light receiving element rows to the distance covered by lens;

DESCRIPTION OF PREFERRED EMBODIMENTS

Now, the invention will be described with reference to FIGS. 3 to 5. In these Figures, like or equivalent parts or positions to those previously discussed are designated by like reference symbols, and their detailed description will be refrained from.

Figure 3:
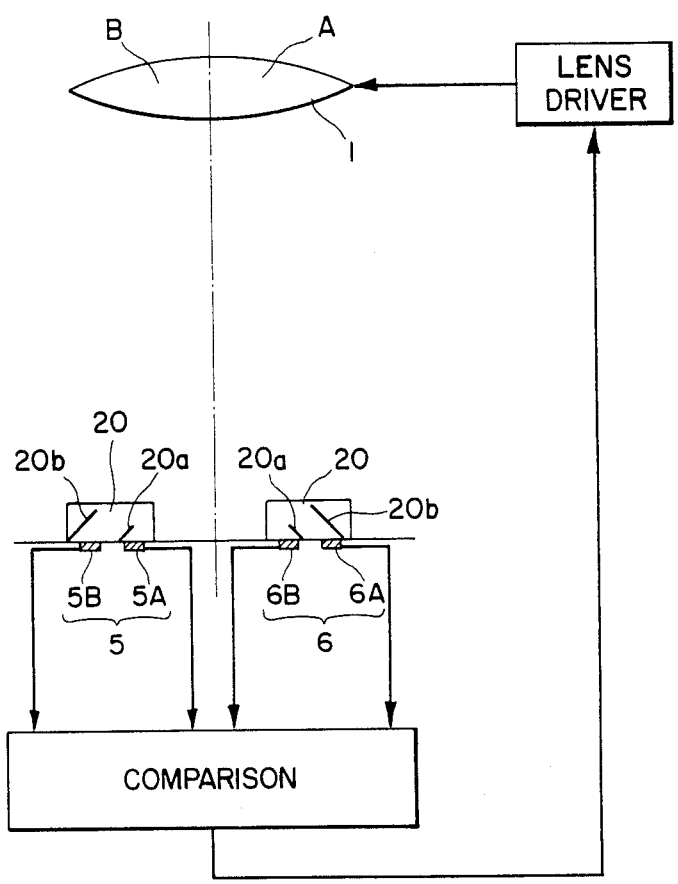
FIG. 3 is a schematic view showing an arrangement for carrying out the focus detection method according to the invention.

FIG. 3 shows an arrangement for carrying out the method according to the invention.

First and second light receiving element row pairs 5 and 6 are disposed in the neighborhood of the optical axis of the photographing lens 1. These pairs are spaced apart in a direction substantially normal to the lens axis. The first light receiving element row pair 5 consists of light receiving element rows 5A and 5B, which are disposed to extend at right angles to the paper. Similarly, the second light receiving element row pair 6 consists of light receiving element rows 6A and 6B. These pairs of element rows 5A and 5B and 6A and 6B each have the same construction as the pair of light receiving element rows 3 and 4 employed in the prior art contrast system.

Light splitters 20 respectively include reflecting mirrors 20a and 20b each for wave front splitting the incident light into two light fluxes and light receiving element rows 5A and 5B and 6A and 6B. This construction is disclosed in Japanese patent application No. 119325/1981 filed by the applicant and entitled "Light Splitter". A light flux is transmitted through two regions A and B of the photographing lens 1 defined by an interface substantially parallel with the longitudinal direction of the light receiving element rows 5A, 5B, 6A and 6B, and the two light fluxes emerging from the projection surface of the photographing lens 1 are incident on the light receiving element rows 5A and 6A and on the light receiving element rows 5B and 6B respectively. The individual light receiving element rows 5 and 6 have the focus detecting function based on the prior art contrast system; that is, the principles discussed before in connection with FIG. 2 apply to each of them. In other words, two focus detection units are provided. With these two units used simultaneously, errors in the detection systems can be averaged so that it is possible to obtain an improved precision of the overall focus detecting function compared to the case where only a single pair of light receiving element rows in used. Of course, it is possible to only either one of the light receiving element row pairs for focus detection by the contrast method.

While in this embodiment the light splitters 20 each use the reflecting mirrors 20a and 20b for wave front splitting the incident light into two light fluxes, it is also possible to use any other optical elements that have the same function as a splitting lens disclosed in Japanese patent application No. 119326/1981 filed by the applicant and entitled "Light Splitter".

The prior art contrast system is incapable of focus detection for regions greatly deviated from the point F of focus as shown in FIG. 2, as described earlier. According to the invention, focus detection for regions greatly spaced apart from the focus point F is done in the manner which will now be described with reference to FIG. 4.

Figure 4:
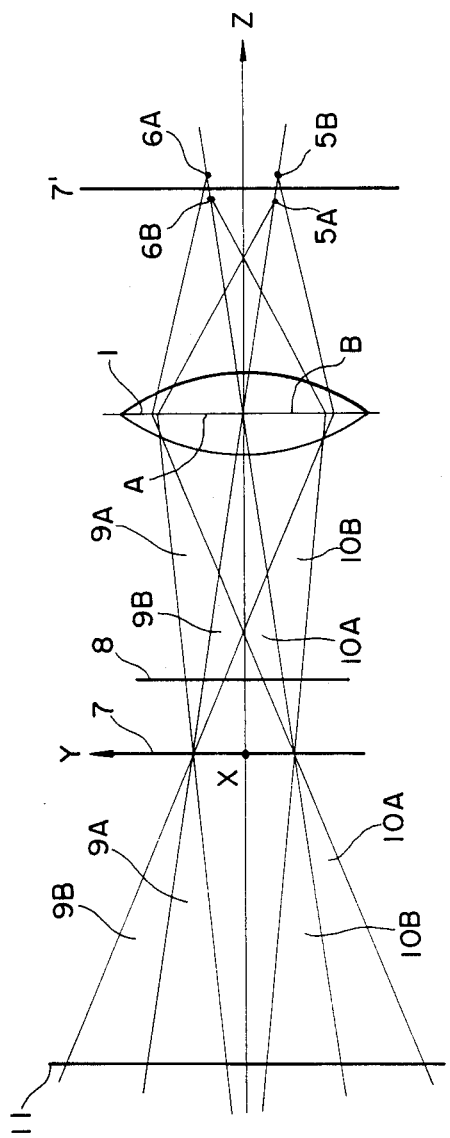
FIG. 4 is an optical diagram showing regions of light fluxes led through a photographing lens to light receiving element rows.

In FIG. 4, the light splitters 20 are omitted, and the individual light receiving element rows 5A, 5B, 6A and 6B are shown respectively as optically equivalent points. Planes 7 and 7' are at optically conjugate positions with respect to the photographing lens 1. The plane 7' is located at a position mid way between the light receiving element rows 5A and 5B or 6A and 6B. On the light receiving element rows 5A, 5B, 6A and 6B are incident light beams that pass through regions 9A, 9B, 10A and 10B after being transmitted through the regions A and B of the photographing lens 1.

If an object is in a plane 8 which is sufficiently closer to the photographing lens 1 than the plane 7, the image on the plane 7' is greatly out of focus. This is because the light rays in portions of the plane 8 corresponding to the regions 9A, 9B, 10A and 10B are integrated before being incidnet on the light receiving element rows 5A, 5B, 6A and 6B.

In this case, different light intensities are detected by the respective light receiving elements because there is usually a certain light intensity distribution in the X- and Y-directions in the plane 8. As is apparent from the Figure, in the plane 8 the regions 9B and 10A are closer to each other than the regions 9A and 10B are; sometimes they may partly overlap. Thus, the light intensity distributions detected by the light receiving element rows 5B and 6A are more similar to each other than the light intensity distributions detected by the light receiving element rows 5A and 6B are.

When the object is on a plane 11 which is sufficiently further apart from the photographing lens 1 than the plane 7, the image on the plane 7' is also greatly out of focus. In this case however, the light intensity distributions detected by the light receiving element rows 5A and 6B are conversely more similar to each other than the light intensity distributions detected by the light receiving element rows 5B and 6A are.

The direction in which the photographing lens has to be moved for focusing can be thus determined from the comparison of the similarities detected by the light receiving element rows 5A, 5B, 6A and 6B even when the image on the plane 7' is greatly out of focus. Various formulas are conceivable for the use for determing the focusing direction. An example of the formula is $$E = \sum_{k=0}^{N-1} |I_{k5B} - I_{k6A}| - \sum_{k=0}^{N-1} |I_{k5A} - I_{k6B}|$$

where I is the light intensity signal obtained from each of the light receiving element rows 5A, 5B, 6A and 6B, and k is the order number given to each of the light receiving elements in the light receiving element rows 5A, 5B, 6A and 6B from one end of each row to the other end. It is assumed that the light receiving elements given the same order number have substantially the same co-ordinate on the X-axis (which extends normal to the plane of paper and contains the intersection between the optical axis and plane 7 in FIG. 4).

Other examples of the determination formula are one, which is the sum of the n-th powers of the individual terms in the above formula, and one, which is the sum of the products of the individual terms and respective weighting factors.

In the above formula, the first summation term represents the degree of asymmetry of the light intensity distributions detected by the light receiving element rows 5A and 6A while the second summation term represents that detected by the light receiving element rows 5A and 6B. Thus, the pre- and post-focus states of the image may be determined from whether E is positive or negative. When E=0, the image is in focus.

Figure 5:
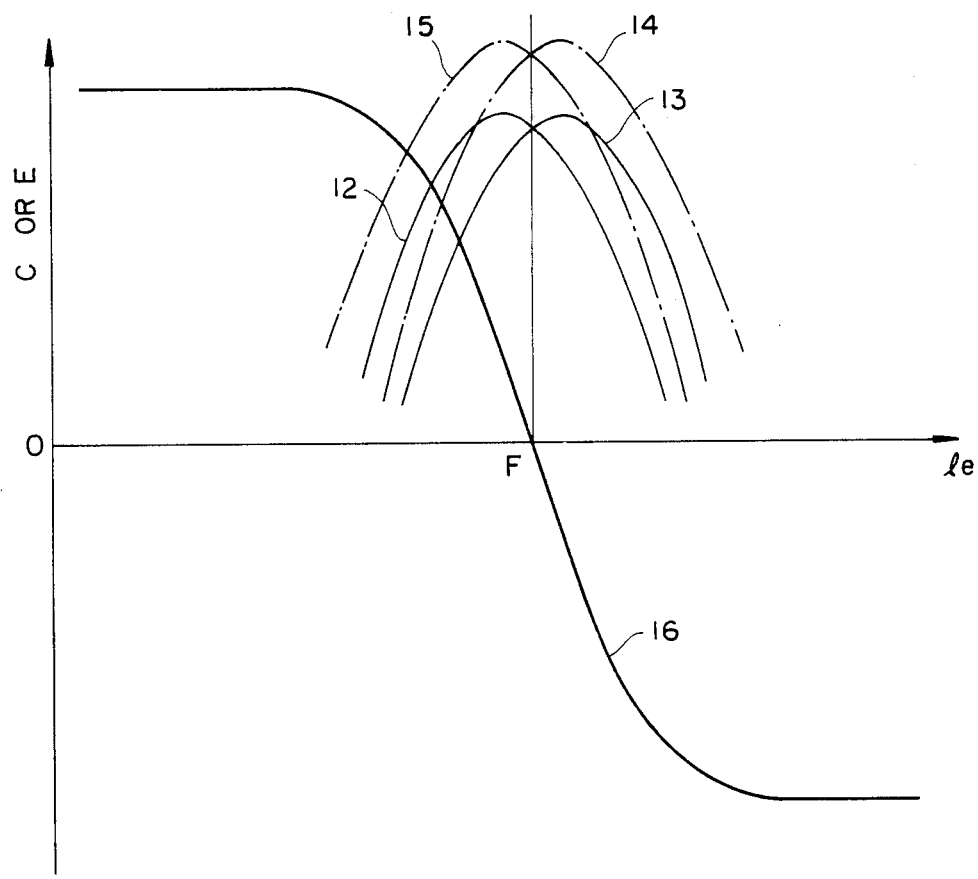
FIG. 5 is a graph showing focus detection signals obtained from the individual light receiving element row pairs.

FIG. 5 shows focus detection signals obtained from the light receiving element rows 5 and 6.

In the Figure, curves 12, 13, 14 and 15 represent contrast signal values C obtained from the respective light receiving element row pairs 5 and 6 plotted against the distance $l_e$ covered by the lens. Curve 16 represents E plotted against the distance $l_e$ covered by the lens.

Whether the image forming plane is in pre-focus, post-focus or focus can be thus determined from the curve for E and also from the comparison of the contrast signal values C in the curves 12 and 13 and also in the curves 14 and 15. The focus can be adjusted by using the results of both the decisions.

As has been described in the foregoing, according to the invention whether the image forming plane is in pre- or post-focus or in focus can be readily determined through comparison of light intensity distributions even in case when the image forming plane is considerably out of focus so that the difference between the contrast signal values is small, in which the determination has been difficult with the prior art contrast method.

Further, according to the invention whether the image forming plane is pre- or post-focus or in focus can be determined accurately and over a wide range of the lens position by using the results of both the detection of E and the comparison of the contrast signal values. Of course it is possible to use only either one of the results, which is convenient from the standpoint of versatility.

Further, while in the above embodiment two light receiving element row pairs have been used, it is also possible to use three or more light receiving element row pairs to carry out the same method. In this case, the detection capacity can be further enhanced.

Further, while in the above case of FIG. 3 the similarity of light intensity distributions has been calculated with respect to the light receiving element rows 5B and 6A and to the light receiving element rows 5A and 6B, it is also possible to calculate the similarity with respect to the light receiving element rows 5A and 6A and also to the light receiving element rows 5B and 6B by inverting one of the light splitters 20.

Further, while the separate light splitters 20 have been provided for the light receiving element rows 5A and 5B and for the light receiving element rows 6A and 6B respectively, it is possible to make these light splitters 20 integral.

What is claimed is:

1. A method of focus detection, comprising:
    providing at least two pairs of light receiving element rows;
    arranging said pairs substantially perpendicular to the optical axis of a photographing lens,
    providing light splitters for the respective light receiving element rows in the light receiving element row pairs, said light splitters each wave front splitting the light flux from said photographing lens into two light fluxes,
    comparing light intensity distributions detected by the light receiving element rows at least between two light receiving element row pairs to determine whether an image forming plane is in pre- or post-focus or in focus,
    and focusing the image forming plane by using the result of comparison.

2. The method of focus detection according to claim 1, wherein each said light splitter is a prism having two reflecting films.

3. A method of focus detection, comprising:
    arranging at least two pairs of light receiving element rows substantially perpendicular to the optical axis of a photographing lens,
    providing light splitters for the respective light receiving element rows in the light receiving element row pairs, said light splitters each wave front splitting the light flux from said photographing lens into two light fluxes,
    comparing at least one of
    (a) light intensity distributions detected by the light receiving element rows at least between two light receiving element row pairs to determine whether an image forming plane is pre- or post-focus or in focus, or
    (b) contrast signal values of the object image detected from the light receiving element rows between the light receiving element rows of at least one of the light receiving element row pairs to determine whether the image forming plate is in pre- or post-focus or in focus, and
    adjusting the focus by using the result of at least one of said comparisons.

4. The method of focus detection according to claim 3, wherein each said light splitter is a prism having two reflecting films.

5. The method of focus detection according to claim 3, wherein said step of adjusting comprises using the result of both of said comparisons.

6. A focus detecting device comprising:
    a first pair of light receiving element rows and a second pair of light receiving element rows, arranged substantially perpendicular to the optical axis of a photographing lens, parallel to each other at an equal short distance from said optical axis; and
    light splitters for the respective light receiving element row pairs, said light splitters each wave front splitting the light fluxes from two regions of said photographing lens, which regions are defined by an interface parallel to said light receiving element row pairs, into two light fluxes incident upon said light receiving element rows in respective light receiving element row pairs.

* * * * *